(12) United States Patent
Nash et al.

(10) Patent No.: US 6,277,425 B1
(45) Date of Patent: *Aug. 21, 2001

(54) METHOD FOR PRODUCING AN EXTRUDED COOKED FOOD PRODUCT

(75) Inventors: J. Barry Nash, Beaufort, NC (US); Salvatore M. Pileggi, Aston; Patrick J. Cassidy, West Chester, both of PA (US); Richard R. Hawkins, Raleigh, NC (US); Jonathan Bosworth, Swarthmore, PA (US)

(73) Assignee: Good Mark Foods, Inc., Garner, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/221,887

(22) Filed: Dec. 28, 1998

(51) Int. Cl.$^7$ ............................. A23P 1/13; A21C 11/04
(52) U.S. Cl. ...................... 426/516; 426/637; 425/377; 425/382.4
(58) Field of Search .................... 426/516, 637, 426/448; 425/377, 376.1, 382.4

(56) References Cited

U.S. PATENT DOCUMENTS

| | | |
|---|---|---|
| 2,543,679 | 2/1951 | Van Riper . |
| 2,705,927 | 4/1955 | Graves . |
| 3,847,531 * | 11/1974 | McComb ......................... 425/464 |
| 3,861,844 * | 1/1975 | Miller ............................... 425/207 |
| 3,925,563 | 12/1975 | Straughn . |
| 3,946,116 * | 3/1976 | Weaver et al. .................... 426/103 |
| 3,970,761 * | 7/1976 | Wenger et al. .................... 425/250 |
| 3,997,684 * | 12/1976 | Williard ............................ 426/550 |
| 4,022,918 * | 5/1977 | Miller ............................... 426/446 |
| 4,051,162 * | 9/1977 | Rose et al. ........................ 426/448 |
| 4,118,164 * | 10/1978 | Wenger et al. .................... 425/202 |
| 4,128,372 | 12/1978 | Rose . |
| 4,156,744 * | 5/1979 | Kiploks et al. ................... 426/637 |
| 4,167,588 * | 9/1979 | Williard ............................ 426/283 |
| 4,198,437 * | 4/1980 | Citti et al. ........................ 426/104 |
| 4,217,083 | 8/1980 | Machuque . |
| 4,440,793 * | 4/1984 | Seki ................................. 426/549 |
| 4,445,838 * | 5/1984 | Groff ................................ 425/319 |
| 4,609,557 * | 9/1986 | Mao et al. ........................ 426/549 |
| 4,609,558 * | 9/1986 | Giacone et al. .................. 426/549 |
| 4,790,996 * | 12/1988 | Roush et al. ..................... 425/458 |
| 4,879,126 * | 11/1989 | Willard et al. ................... 426/272 |
| 4,985,262 | 1/1991 | Camire . |
| 5,059,439 * | 10/1991 | Wenger et al. .................... 426/451 |
| 5,061,507 * | 10/1991 | Aulik et al. ...................... 426/637 |
| 5,149,555 * | 9/1992 | Flindall ............................ 426/448 |
| 5,189,092 * | 2/1993 | Koslow ............................ 524/488 |
| 5,391,073 * | 2/1995 | Herod et al. ..................... 425/377 |
| 5,725,902 | 3/1998 | Lesueur-Brymer . |

* cited by examiner

*Primary Examiner*—Milton Cano
*Assistant Examiner*—Sherry A. Dauerman
(74) *Attorney, Agent, or Firm*—Olive & Olive, P.A.

(57) ABSTRACT

An apparatus and method for manufacturing an extruded cooked food product including use of an extruder having a barrel, at least one screw contained therein, a feed element at the discharge end of the screw, and a die head containing an expansion chamber. The discharge feed element is formed with a large pitch for pushing a large volume of cooked food mix into the expansion chamber. The large volume of cooked food mix is extruded as extrudate strands through relatively large orifices extending through the die plate of the die head to dimensionally expand upon exiting the orifices. The extrudate strands are conveyed over a sole support bar located a significant distance from the die head and then to a cutter. An air flow is applied to the extrudate strands for further cooling and drying before being cut. The cutter is located approximately 90 inches from the die head. The extruded food product is uniform in cross-section.

7 Claims, 7 Drawing Sheets

METHOD FOR PRODUCING AN EXTRUDED COOKED FOOD PRODUCT

BACKGROUND OF THE INVENTION

1. Field of the Invention

The present invention relates to an extruded food product and a new method and apparatus for preparing such extruded food product, and more particularly to a new extruder line comprising an extruder and conveyor system of the invention for preparing an extruded food product that is wide in all cross-section dimensions.

2. Background of the Prior Art

Foods that are sold as snack products enjoy wide popularity with consumers. Typical examples of snack food products are potato chips, corn chips, corn puffs, and the like. Generally, snack foods are consumed as a source of pleasure, rather than nourishment. Thus, the aesthetic appeal of such snack foods is paramount. Shape, size, and color, as well as the general appearance and taste of a snack food product are very important to the market success of a snack food. A further characteristic that improves market appeal in a snack food is its texture, or crunch.

Manufacturing food products by cooking and extruding the ingredients in a cooking food extruder is well known in the art and is commonly used in the manufacture of snack foods. In order for the food ingredients to cook properly, the ingredients must be evenly heated in the extruder barrel and continually mixed by the extruder screw(s) to obtain a homogenous and uniformly shaped product. The intense pressure and high temperatures within the extruder causes the starch within the food material to gelatinize and cook.

Extruders in the food-processing field are sold as single or dual units, and are selected based on the particular food application. The screws of the dual and single screw extruders include segments with helical flights referred to as "feeding elements" for transporting the food ingredients toward the die plate and include other segments with kneading and mixing lobes, referred to in the art as "paddles." By mixing and extruding a food product in the extruder barrel, the food product is more homogeneous.

In general, dry ingredients in prescribed proportions are blended and then introduced to a cooking extruder, possibly with water and/or other ingredients. The blending step may involve the addition of liquid ingredients to dry ingredients to adjust the moisture level. Through a combination of shear, pressure, and heat of the extruder, the starch within the food is gelatinized. The final shape of the food product is formed by rapid expansion when the cooked ingredients exit the cooking extruder through a number of orifices in a die plate, e.g., by moving from a confined zone of high pressure to an unconfined zone of much lower pressure, i.e., the atmosphere. Upon discharge from orifices in the die plate of the extruder into the atmosphere, the extrudate rapidly expands to its final form and is then cut into discrete lengths by a rotating cutter positioned adjacent the extruder die head. The length of the cut pieces is a function of the speed of the cutter rotation and the speed of extruding.

One type of snack food that can be made by cooking extruders is the French fried potato, or French fry. This snack food is made by blending potato and corn, or any other starch based grain, and processing the blend in a cooking extruder. The addition of oil and spice occurs after the drying step. In known prior methods of processing French fries, the maximum cross-sectional dimensions that have been achievable, while maintaining significant extruded food product crunch and shape uniformity, are less than 0.3 inch×0.4 inch. When extruding starch based grains, it is generally known that as the cross-sectional dimensions of the extruded food product increases the food product cell size (size of air pockets in the formed extruded food product) also increases, which decreases the desirable crunchy texture of the food product. It is recognized that a crunchy, uniformly shaped, French fry of increased size, generally called a "steak fry," may be more attractive to many purchasers. Even "small" increases in size, for example, a steak fry with a cross-section equal to 0.5 inch×0.5 inch, while maintaining significant crunch and shape uniformity, would be significant in this highly competitive field.

Two patents discussed briefly below disclose extruders and methods for producing extruded snack food products. U.S. Pat. No. 3,925,563, entitled Preparing An Extruded Puffed Snack Product, discloses a die plate in FIGS. 2 and 3, having a series of plus (+) shaped orifices (37) for extruding a food product that subsequently expands to a square cross section. The apparatus and method disclosed in the '563 patent produces a snack food having a cross sectional shape with each side of the square being less than 0.33 inches.

U.S. Pat. No. 4,985,262 is for a Process for Preparing A Snack Product. The '262 patent discloses a process for coating an extruded fannaceous-based French fry with a combination of flour, aqueous liquid, and oil. However, the invention of the '262 patent describes an irregularly shaped product having cross sectional dimensions in the range of only 0.30–0.40 inches.

Using currently available extruders and extruder assembly lines, attempts at increasing the length of each cross-section side of rectangular extruded food products, for example, results in a highly undesirable extruded snack food product. As the die orifice size is increased to form ever-larger extruded food products, the expanded extrudate formed is highly inconsistent in shape, weight and density. It was also found that when a large extruded food product (extrudate) was cut immediately adjacent the die plate discharge end as is the normal practice in the art, the ends were crimped, causing the resulting product to have an extremely undesirable shape and look.

With the foregoing in mind, it becomes a general object of the present invention to provide an extruder line for preparing an extruded food product that is wide in all cross-sectional dimensions.

It is also an object of the present invention to provide an extruded food product that has cross sectional dimensions of more than 0.40 inches per side of a rectangular extruded food product.

It is a further object of the present invention to provide a crunchy extruded snack food product that has cross sectional dimensions of approximately more than 0.5 inches per side of a rectangular extruded food product.

It is another object of the present invention to provide an extruded food product that is uniform in cross sectional shape and uniform in length of piece.

It is another object of the present invention to provide an extruder having an expansion chamber within the extruder die head for providing an increase in volume of food mix immediately preceding the extruder die plate.

It is yet another object of the present invention to provide an extruder line having an extruder with a discharge feed element immediately preceding the expansion chamber of the present invention for providing an increase in volume of food mix at the exit end of the extruder barrel.

It is a further object of the invention to provide an extruder line having a conveyor system for conveying the extrudate strands through ambient air to cool and solidify the extrudate.

It is another object of the invention to provide an extruder line having an air nozzle to cool and solidify the extrudate.

These and other objects will become more apparent from the following disclosure and claims.

SUMMARY OF THE INVENTION

The present invention provides a novel apparatus and method to produce an extruded large size food product, preferably and by example only, a larger French fry referred to herein as a "steak fry." The apparatus comprises an extruder, a strand conveyor and strand support device, and a strand-cooling device. The extruder of the present invention comprises at least one extruder screw having a discharge feed element specially formed to push a large volume of food mix through the transition plate of the extruder die head into an expansion chamber formed by a spacer ring of the invention. The expansion chamber conveys a large volume of evenly dispersed food mix to a plurality of large die orifices of the present invention, through which the food mix then exits into the environment as extrudate. In the preferred embodiment, upon discharge from the die orifices, the extrudate rapidly expands to form a plurality of continuous strands having a generally rectangular cross sectional shape with each side of the rectangle being more than 0.4 inches, preferably more than 0.5 inches. The strands are conveyed by a unique conveyor system having features of the present invention from the die head to a remotely located extrudate cutter. The unique conveyor system of the invention comprises a catenary strand support device located a significant distance from a die head and the cutter as the sole support of the extrudate during conveyance. A cooler is mounted adjacent the catenary strand support device and directs an air stream over the strands to enhance strand moisture loss. The cutter cuts the strands where the strands are conveyed to further processing steps.

DESCRIPTION OF THE PREFERRED EMBODIMENT OF THE INVENTION

Figure 1:
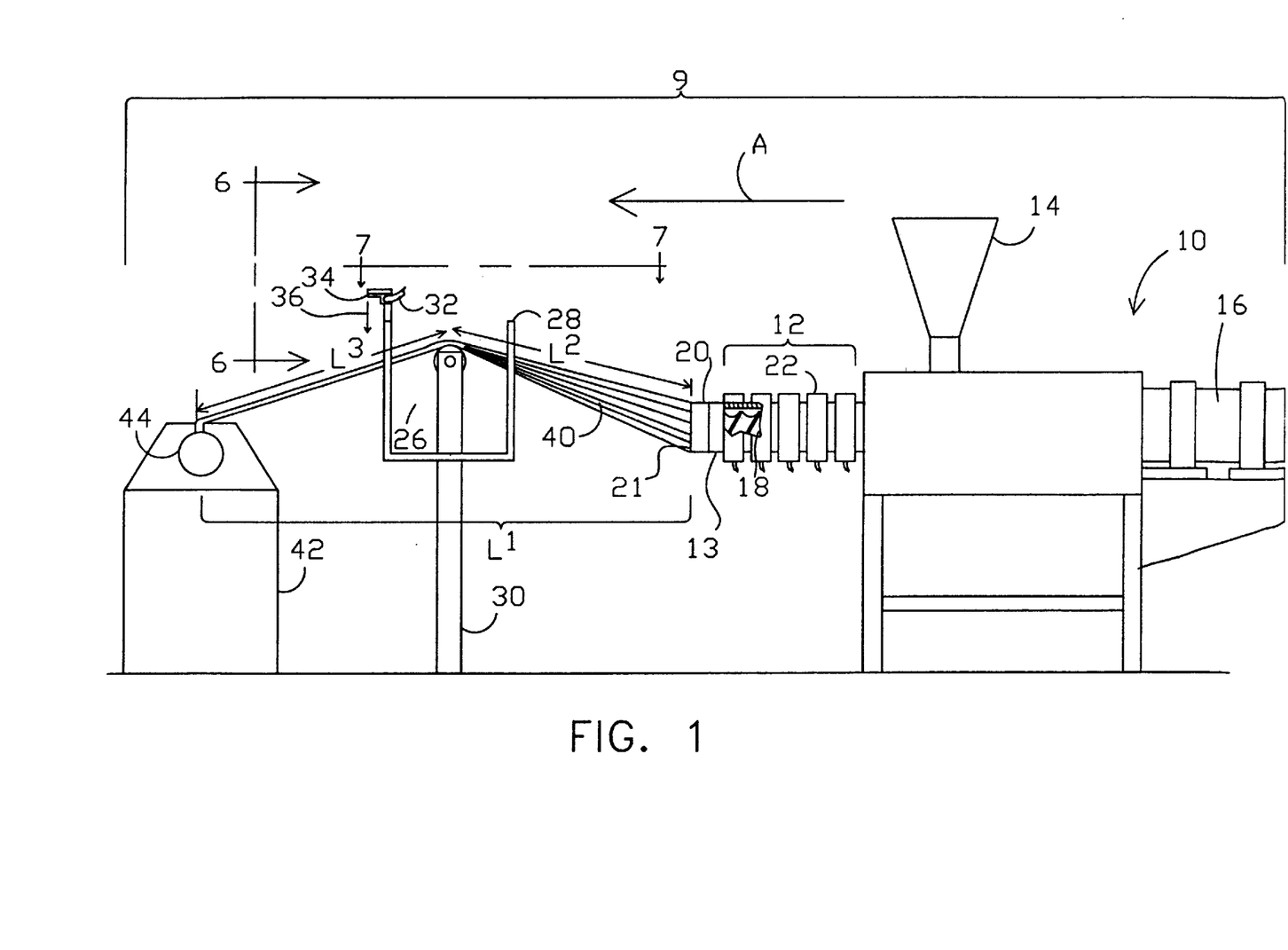
FIG. 1 is a schematic side elevation view of the apparatus of the present invention.

In accordance with the preferred embodiment of the present invention, FIG. 1 portrays an extruder processing line 9 as is utilized for the production of an improved extruded food product. In the preferred embodiment of the present invention, extruder 10 is a dual screw extruder. FIG. 1 shows one screw 18 of the present invention supported within barrel 12 so as to be driven rotationally by motor 16. The rotation of screw 18 generates a forwardly directed pressure, in the direction shown by arrow A, drawing mixed ingredients from supply hopper 14 through barrel 12 to die head 20. Due to the exposure of the mixed food ingredients to elevated temperatures of band heaters 22 along barrel 12, the ingredients exit through die head 20 as a cooked food product, designated as extrudate 40, which is comprised of a plurality of extrudate strands. Extrudate 40 is also referred to herein as "extrudate strands." Extrudate strands 40 are conveyed to a horizontal elongate bar 26 mounted upon support stand 30 and then to a downstream cutter 42, which is located a significant distance $L^1$ of approximately 90 inches from die head 20. Cutter 42 includes rotary blade assembly 44. The distance between die head 20 and support stand 30 is identified as L2, and the distance between support stand 30 and cutter 42 is identified as L3. Horizontal bar 26 is mounted on support stand 30 at a height that is greater than the height of barrel 12 above the floor in order to add still more length to the travel distance of extrudate 40 between die head 20 and cutter 42. Horizontal bar 26 is the sole support for extrudate strands 40 between die head 20 and cutter 42. In accordance with the present invention, extrudate strands 40 are evenly distributed across and supported upon horizontal bar 26 during conveyance to cutter 42, so as to reduce the unsupported length of extrudate strands 40 and resultant extrudate strand tension. Thus, the total distance represented by $L^2$ plus $L^3$ is much greater than extrudate 40 would otherwise tolerate (without extrudate support by horizontal bar 26 of the invention) without stretching or tearing.

Referring still to FIG. 1, linear air nozzle 34 is mounted above extrudate 40 in a position adjacent to and downstream of horizontal bar 26 to direct a flow of air from compressed air supply line 32 substantially vertically downward to extrudate strands 40 being conveyed therebeneath. Linear air nozzle 34 is also known as an "air knife," which is typically used to blow liquids, chips, and dust from conveyors, and to quickly cool hot mechanical parts moving along a conveyor. Horizontal bar 26 and linear air nozzle 34 are oriented substantially parallel to each other and normal to the direction of travel of extrudate 40. Cutter 42 may be of any cutter form known in the trade and able to cut an extruded food product into uniform length pieces. Extruder 10 is, in the preferred embodiment, a dual screw model MPF65 manufactured by APV Baker of Grand Rapids, Mich.

Figure 2:
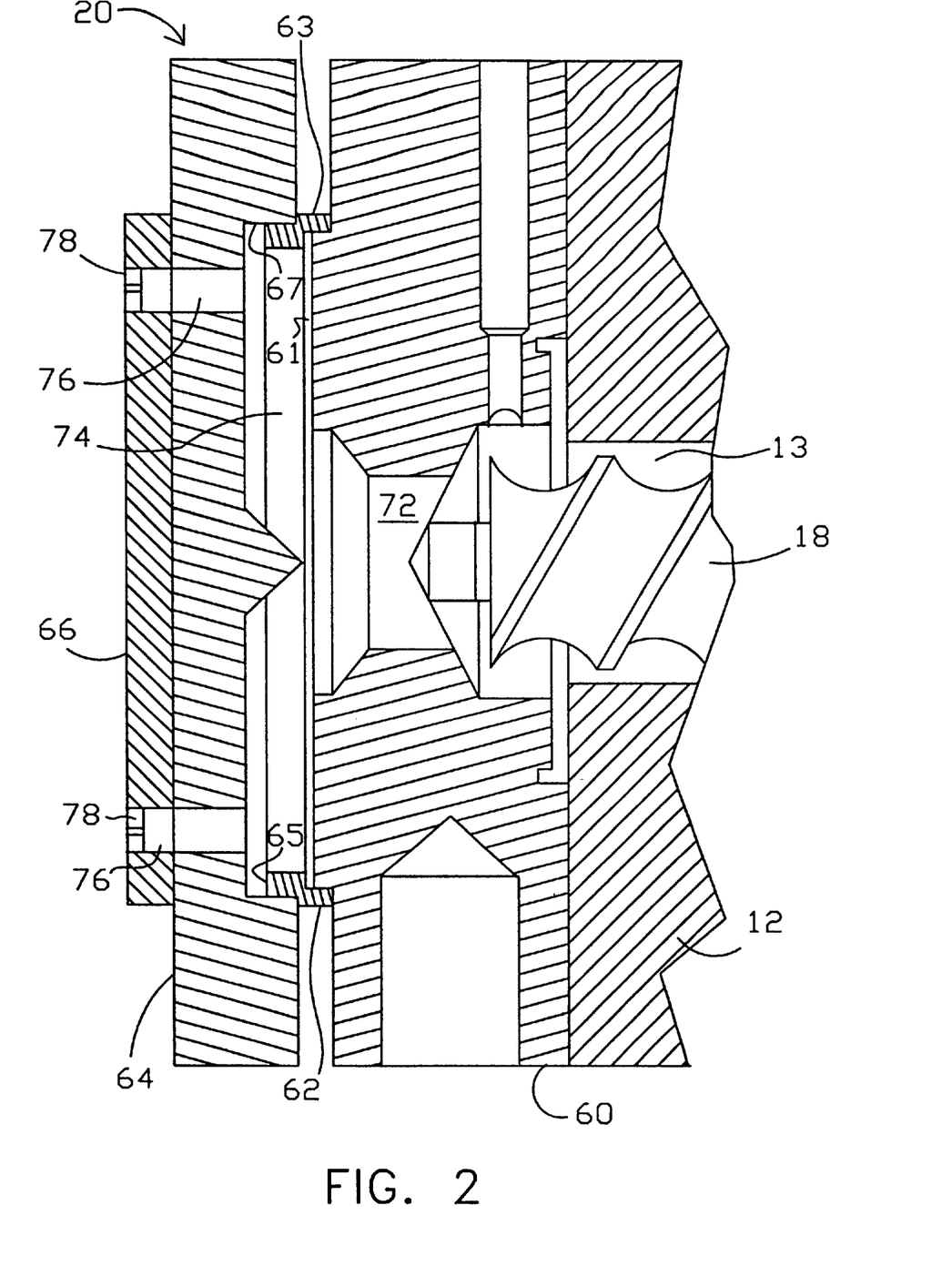
FIG. 2 is an enlarged cross sectional view of one end of the extruder barrel supporting an end feed element therein, and the die head of the present invention.

Now referring to FIG. 2, die head 20 of the present invention includes a transition plate 60, spacer 62 of the invention, mounting plate 64 and die plate 66. Mounting plate 64 contains a plurality of feed channels 76 extending therethrough that are contiguous with a corresponding plurality of orifices 78 extending through die plate 66 to the atmosphere. Current extruders are constructed such that mounting plate 64 is releasably and directly attached to transition plate 60 by a series of screws. The present invention, however, includes spacer 62 sandwiched between transition plate 60 and mounting plate 64. In the preferred embodiment, spacer 62 is a ring, configured with a diameter approximately seven (7) times its axial length, surrounding a substantially large center space referred to herein as expansion chamber 74. Spacer 62 is mounted to transition plate 60 and mounting plate 64 is mounted to spacer 62, such that throat 72 of transition plate 60 is continuous with expansion chamber 74 formed by spacer 62, and expansion chamber 74 is continuous with feed channels 76 of mounting plate 64 and orifices 78 of die plate 66, which are continuous with the atmosphere. Transition plate 60 mounts to the exit end of barrel 12 such that throat 72 is co-axial and continuous with barrel 12. Transition plate 60, spacer 62, mounting plate 64, and die plate 66 of die head 20 are mounted to barrel 12 by a series of screws (see FIG. 3).

Figure 3:
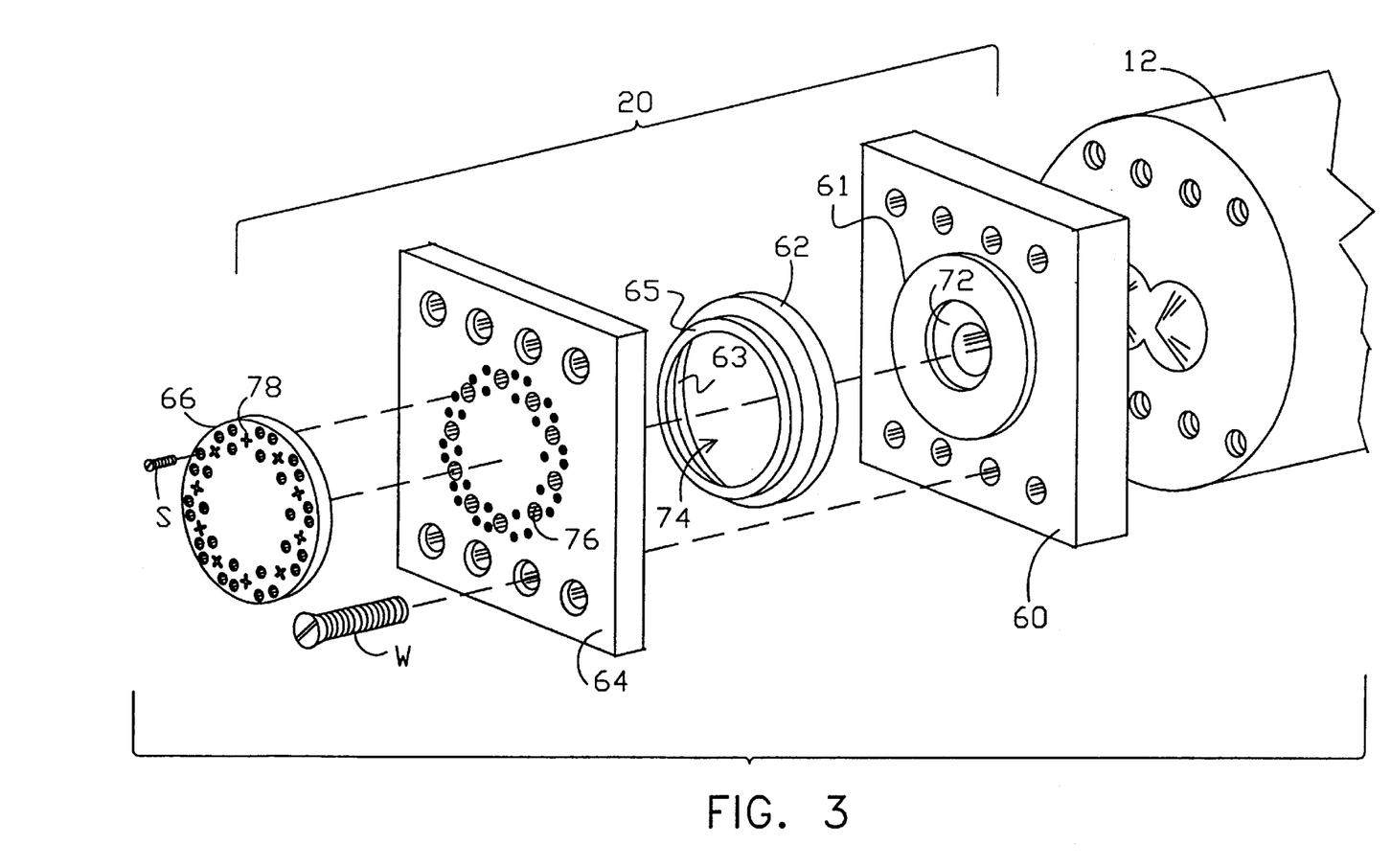
FIG. 3 is an exploded perspective view of one end of the extruder barrel and the extruder die head of the present invention.

Referring now to FIGS. 2 and 3, the component parts of die head 20 of the present invention are configured to assemble co-axially and sealingly to adjacent parts, with secure fasteners, such as machine screws S and W. Spacer 62 is securely mounted within die head 20 by sleeve 63 which grips flange 61 of transition plate 60 and flange 65, which is gripped within sleeve 67 (see FIG. 2) of mounting plate 64.

Feed channels 76 extend through and are evenly distributed around mounting plate 64 at an equal distance from its center. Die orifices 78 extend through and are positioned around die plate 66 so as to coincide with respective feed channels 76 when die plate 66 is assembled to mounting plate 64. Die orifices 78 are each formed as a pair of crossed thin slits to appear as a plus sign (+). In the preferred embodiment the dimensions of each slit are approximately 0.240 inches long by 0.040 inches wide. Die orifices 78 are generally positioned about die plate 66 with one of the slits oriented radially in relation to die plate 66.

Figure 4:
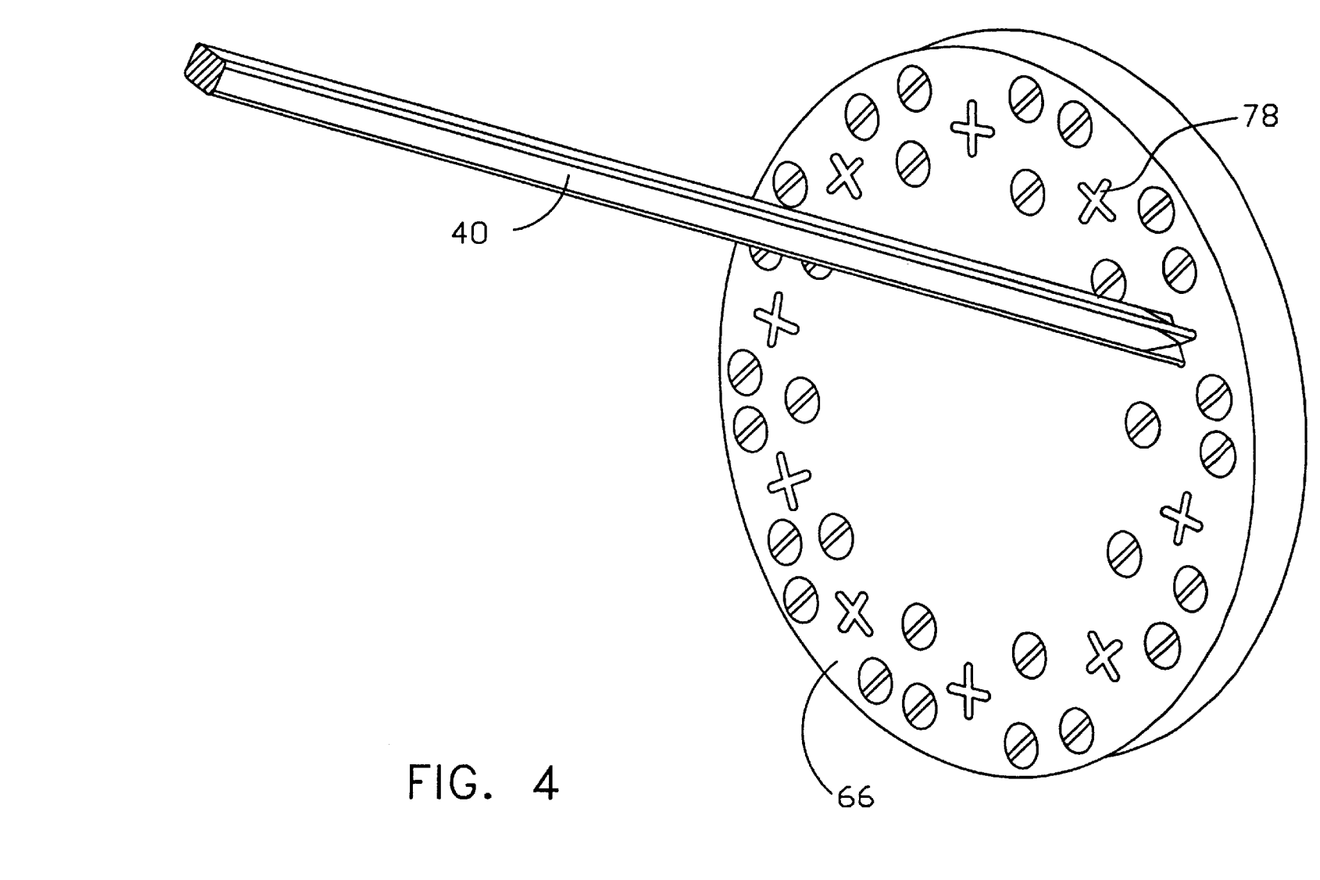
FIG. 4 is an enlarged perspective view of the die plate with a series of plus shaped (+) die plate orifices extending therethrough showing an extrudate being discharged from one such orifice and expanding to a rectangular cross section.

As illustrated in FIG. 4, a perspective view of die plate 66 is shown with a single strand of extrudate 40 being extruded through one of the plurality of die orifices 78. As extrudate 40 emerges from die orifices 78 under pressure and in the shape of a plus sign (+), extrudate 40 rapidly expands in the atmosphere (low pressure) to fill out a substantially rectangular cross section.

Figure 5:
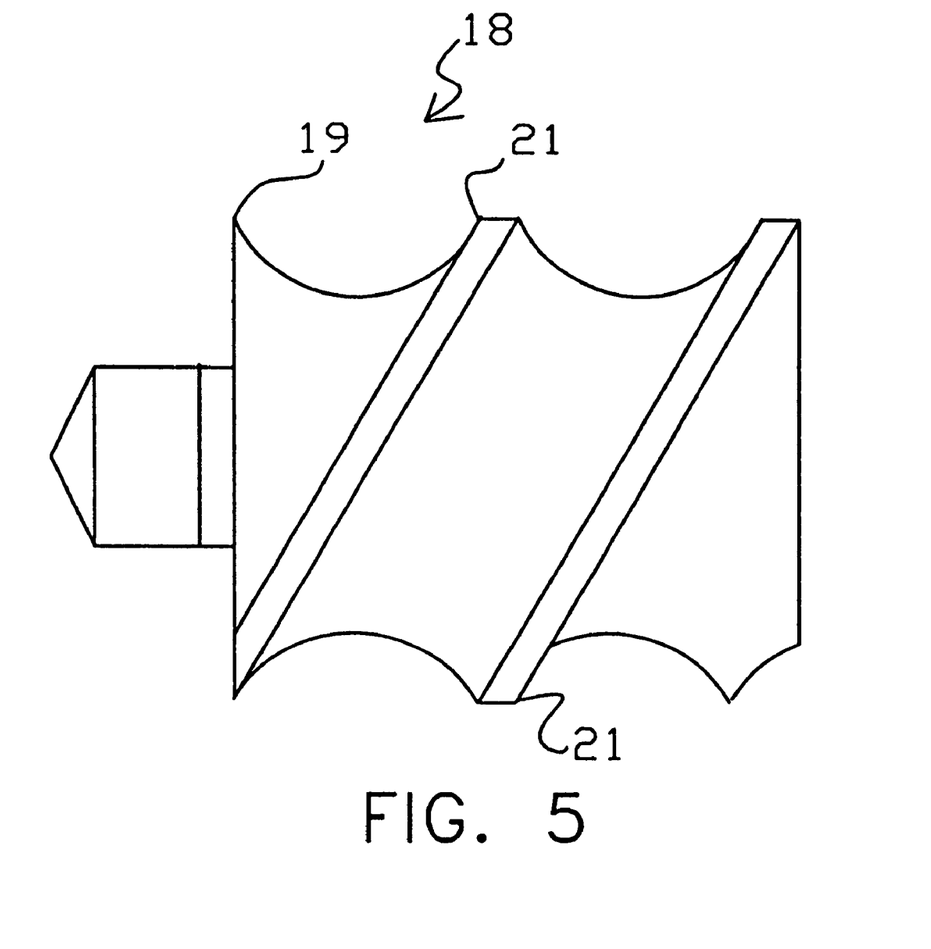
FIG. 5 is an enlarged side elevation view of the discharge feed element of the present invention.

Referring to FIG. 5, discharge feed element 19 of screw 18 of the present invention is situated adjacent the extruder discharge end 21 (FIG. 1) and is formed to have a relatively long pitch. In the preferred embodiment as shown in FIG. 5, discharge feed element 19 has a pitch, which is the distance between two corresponding points on adjacent screw threads 21, of 1.0 to 1.5 inches. Increasing the discharge feed element 19 pitch increases the volume of the food mix pushed forward by discharge feed element 19. Discharge feed element 19 of the present invention causes a step-up in volume of food mix adjacent the discharge end 13 of barrel 12 (see FIG. 1).

Figure 6:
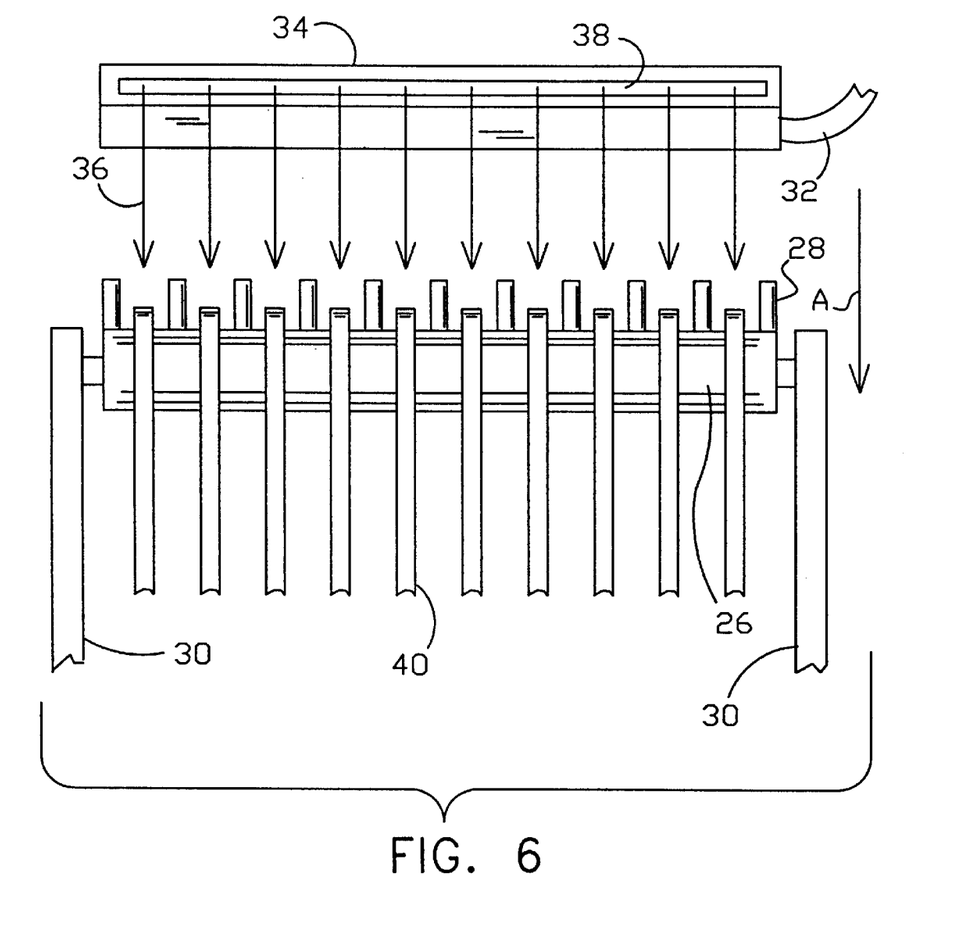
FIG. 6 is an enlarged side sectional view of a portion of the extruder line of FIG. 1 looking upstream in the direction indicated by line 6—6.

FIG. 6 shows the horizontal bar 26 and air nozzle 34 in more detail and in a direction downstream to upstream, as indicated in FIG. 1 as line 6—6. Horizontal bar 26 is formed as a single cylindrical bar with a set of separators 28 positioned adjacent bar 26 and oriented perpendicular thereto. Separators 28 extend higher than bar 26 and serve to keep the individual extrudate strand 40 out of contact with one another during the conveying, cooling, and drying process.

Air nozzle 34 is positioned to direct a flow of air 36 onto extrudate strands 40 as they pass over bar 26. In the preferred embodiment, the flow of air is in a substantially vertically downward direction. However, it is understood that the flow of air may be directed upstream or downstream to change the extrudate cooling characteristics of the flow of air. Air nozzle 34 receives air from air supply line 32 that is connected to a compressed air source (not shown). Air nozzle 34 is configured as a round cylindrical tube with an elongate, narrow orifice 38 to form a substantially planar airflow 36 across the entire width of extrudate strands 40. By separating the cutter 42 a substantial distance from head 20 so that the expanded extrudate strands are cooled by the ambient air during cooling and by additionally cooling and drying extrudate strands 40 with air-flow 36 from nozzle 34, extrudate strands 40 are is dimensionally stabilized and can be cut more cleanly, without forming crimped ends. A specific nozzle adaptable to the present invention is known as a Linear Air and Blow-Off Nozzle, made by Exair Corporation of Cincinnati, Ohio.

Figure 7:
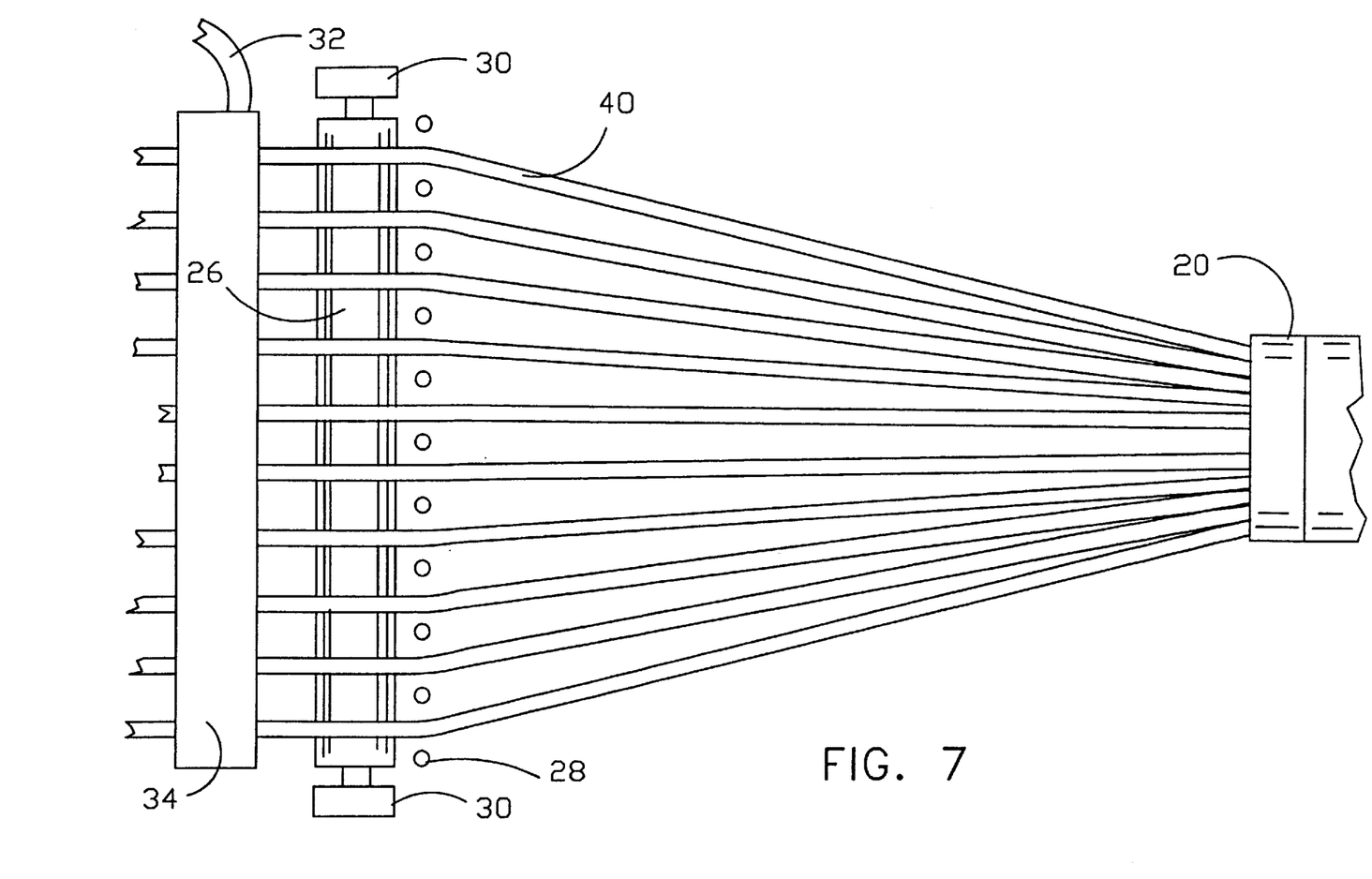
FIG. 7 is an enlarged top sectional view of a section of the extruder line of FIG. 1 taken in the direction indicated by line 7—7.

FIG. 7 illustrates an enlarged top view of the area from die head 20 to a position just beyond bar 26 in the direction of line 7—7 of FIG. 1. Extrudate strands 40 emerge from die head 20 as a circular array and are guided by separators 28 to be spread across the top surface of bar 26 as a linear array. The spread pattern thus achieved allows better natural air circulation and imposed air circulation from air nozzle 34.

In summary, operation of the apparatus of the invention, includes a unique discharge feed element 19 of extruder barrel 12 and expansion chamber 74 formed within the die head 20. In operation, discharge feed element 19 continually supplies a large amount of food mix to expansion chamber 74. The large volume of food mix being pushed into expansion chamber 74 by feed element 19 is resident within expansion chamber 74 for a time to become thoroughly mixed and present throughout expansion chamber 74, thereby causing the temperature of the food mix to be even throughout. The food mix is then forced evenly and consistently through all feed channels 76 and corresponding plurality of die orifices 78 for release into the atmosphere. Thus, in accordance with the present invention, the food mix flowing through each die orifice 78 is of the same consistency, volume, and temperature and, upon release into the atmosphere, each extrudate strand 40 expands to the same shape, density, and consistency as the companion extrudate strands 40. Extrudate strands 40 are uniform in shape and size and are large in all cross-sectional dimensions. Discharge feed element 19 and expansion chamber 74 of the invention are especially critical when forming large sized extrudate 40 using a relatively large number of die orifices 78 for high volume manufacturing.

Once extrudate strands 40 enter the atmosphere they release a substantial amount of moisture in the form of steam which causes expansion of extrudal strands 40. Extrudate strands 40 are then carried a significant distance through the air to sole support bar 26 as explained above, and then farther conveyed to a cutter 42, where they are cut into selected lengths, preferably 3.0 to 3.5 inches. The present invention recognizes that the continuous surface conveyor systems as are currently used in the food industry to support and convey extruded food products from one processing station to another are unacceptable for use with the large extrudate of the present invention. The surface conveyors cause the extrudate to dry unevenly and slowly, and to malform, due to the substantial weight of the extrudate upon the conveyor. Thus, in accordance with the present invention, extrudate strands 40 are conveyed by running extrudate strands 40 to a cutter 42 placed a significant distance from the die head 20 and are supported therebetween by a sole support bar 26, such that ambient air completely surrounds extrudate strands 40 along its conveyance path to evenly dry and cool each extrudate strand 40 with minimal stretching and malformation. Air nozzle 34, of the invention, applies air across extrudate strands 40 to enhance cooling and drying before extrudate strands 40 are cut by cutter 42. Cutter 42 cuts extrudate strands 40 into selected lengths of extruded food pieces. The extruded food pieces of the invention have cross sectional dimensions more than 0.4 inches per side, and preferably more than 0.5 inches per side. These dimensions are significantly greater than that found in currently extruded food products. In addition, the extruded food pieces of the invention have opposed longitudinal sides that are substantially parallel to each other throughout their length, and have uncrimped cleanly cut end portions, such that extrude food pieces are consistently shaped like a regular potato steak fry, for example. However, it is understood that the present invention is directed to producing an extruded food product that is wide in all cross-section dimensions, regardless of the product shape. Thus, the present invention could be formed as tubes characterized by substantially large and consistent diameters along the length of each such piece and cleanly cut end portions.

We now discuss the method for preparing the extruded food product of the invention, which includes first preparing a food mix consisting of 70–85% ground corn meal and 5–15% dried potato. Forty-five pounds of water was added to 1800 pounds of corn meal/grits and mixed for 10 minutes. Gradually, 320 pounds of dried potato granules/flakes was added to the mix and mixed for an additional 10 minutes. Mixing times between 15 minutes and one hour are acceptable. Once the mix is within a 12% to 13.5% moisture range, the mix is added to extruder 10. The mixed ingredients are cooked within the extruder barrel 12 within the several sequential heat zones. Referring again to FIG. 1, each heat zone is heated by an individual band heater 22, and each zone has an individual thermal probe (not shown) that provides feedback to a control thermostat (not shown) that is adjusted for maintaining the respective selected temperature. Accordingly, a desired temperature for each zone is in the range of 20° C. (68° F.) to 180° C. (356° F.). Specific temperature settings according to the preferred embodiment are approximately 26° C. (79° F.) in a first heat zone located adjacent supply hopper 14, about 40° C. (104° F.) in a second heat zone located next farther from supply hopper 14, about 95° C. (203° F.) in a third heat zone located next farther from supply hopper 14, and about 150° C. (302° F.) in a last heat zone adjacent die head 20.

As the ingredients are moved through the extruder barrel 12, they are exposed to an alternating series of sections (not shown) of screw 18 to provide forward movement and kneading. The process includes increasing the food mix volume immediately prior to discharge from barrel 12, and increasing the volume of the food mix within die head 20, and evenly distributing the food mix within that increased volume. The present invention also includes increasing the size of feed channels 76 and die orifices 78 as is known in the art, such that immediately upon exiting die plate 20, extrudate strands 40 expand to a cross-section greater than 0.4 inch per side, and preferably greater than 0.5 inches per side. The next step includes conveying extrudate strands 40 and surrounding extrudate strands 40 with ambient air during conveyance to cutter 42, which is placed at a significant distance from die head 20. A further step is cooling extrudate strands 40 by applying thereto pressurized airflow from air nozzle 36. (FIGS. 1, 6 & 7). By separating die head 20 and cutter 42 by 90 inches according to the preferred embodiment of the present invention, and by applying pressurized air flow to the extrudate strands 40, extrudate strands 40 cool and dry more fully and is more dimensionally stabilized, such that when extrudate strands 40 are cut by cutter 42 the ends are cleanly cut and do not crimp. Cutter 42 cuts extrudate strands 40 into 3 to 3.5 inch lengths. The cut steak fry product of the invention is then pneumatically conveyed to a dual stage dryer where the moisture is reduced from 12% to 3%. The strands are sprayed with 24–28% partially hydrogenated soybean oil and then they are coated with a topical seasoning that imparts the desired flavor.

While the invention is disclosed above in respect of a preferred embodiment thereof, it is recognized that numerous variations and modifications are possible, and such variations and modifications are to be considered as being within the spirit and scope of this invention, the substance of which is limited only by the claims that follow.

What is claimed is:

1. A method for producing an expanded cooked food product, comprising of the steps of:

(a) providing a selected group of ingredients;

(b) mixing the food ingredients to form a food mix;

(c) providing an extruder with a barrel having a plurality of screws rotatably mounted therewithin;

(d) conveying the food mix through the extruder barrel by rotating the plurality of screws;

(e) cooking the food mix as it is being conveyed through the extruder barrel;

(f) passing the cooked food mix through a single central expansion chamber formed in a die assembly that is removeably connected to the discharge end of the barrel, the expansion chamber being substantially greater in a radial dimension than an axial dimension;

(g) mixing the cooked food product in the expansion chamber;

(h) extruding the cooked food product from the expansion chamber through a plurality of die orifices of a selected shape formed in a die plate so as to form a cooked food product extrudate having a desired cross-sectional configuration;

(I) supporting the cooked food product extrudate with a support positioned between the extruder and a cutting apparatus, the support at a height that is greater than the height of barrel and the cutting apparatus, so as to permit ambient air to surround the cooked food product extrudate along an extended path;

(j) cooling and drying the cooked food product extrudate; and (k) cutting the cooked food product extrudate to form food pieces of a selected length.

2. The method for producing an expanded extruded cooked food product as claimed in claim 1, wherein supporting the cooked food product extrudate comprises supporting the cooked food product extrudate by a catenary strand support positioned between the die plate and the apparatus for cutting as the sole support of the extrudate during conveyance.

3. The method for producing an expanded extruded cooked food product as claimed in claim 1, wherein the single centrally positioned expansion chamber has a diameter approximately seven times an axial length thereof to thoroughly blend the food mix prior to the food mix passing through the die orifices.

4. The method for producing an expanded extruded cooked food product as claimed in claim 1, wherein the food product extrudate has a substantially rectangular cross sectional configuration.

5. The method for producing an expanded extruded cooked food product as claimed in claim 4, wherein the cross sectional configuration is greater than 0.4 inches per side and wherein the food product is formed having a cell size so as to impart a crunchy texture to the food product.

6. The method for producing an expanded extruded food product as claimed in claim 4, wherein the cross sectional configuration is at least 0.5 inches per side.

7. The method for producing an expanded extruded cooked food product as claimed in claim 3, wherein the cooked food product is a steak fry snack food product having a substantially rectangular cross-sectional configuration greater than 0.4 inches per side and a length on the order of 3.0 to 3.5 inches, and wherein the step of providing food ingredients includes providing dried potato to the mix.

* * * * *

UNITED STATES PATENT AND TRADEMARK OFFICE
CERTIFICATE OF CORRECTION

| | |
|---|---|
| PATENT NO. | : 6,277,425 B1 |
| DATED | : August 21, 2001 |
| INVENTOR(S) | : J. Barry Nash, Salvatore M. Pileggi, Patrick J. Cassidy, Richard R. Hawkins, and Jonathan Bosworth |

It is certified that error appears in the above-identified patent and that said Letters Patent is hereby corrected as shown below:

Column 2,
Line 26, "fannaceous-based" should read -- farinaceous-based --.

Column 6,
Line 46, "farther" should read -- further --.

Column 7,
Line 7, "extrude" should read -- extruded --.

Column 8,
Line 42, "(I)" should read -- (i) --.

Signed and Sealed this

Ninth Day of April, 2002

Attest:

*Attesting Officer*

JAMES E. ROGAN
*Director of the United States Patent and Trademark Office*